(12) United States Patent
Ewing et al.

(10) Patent No.: US 11,655,016 B2
(45) Date of Patent: May 23, 2023

(54) PRESSURIZED MONOCOQUE STRUCTURE WITH ABRUPT CHANGE IN SHAPE

(71) Applicant: THE BOEING COMPANY, Chicago, IL (US)

(72) Inventors: Richard F. Ewing, Everett, WA (US); Steven D. Ingham, Everett, WA (US)

(73) Assignee: The Boeing Company, Chicago, IL (US)

( * ) Notice: Subject to any disclaimer, the term of this patent is extended or adjusted under 35 U.S.C. 154(b) by 486 days.

(21) Appl. No.: 16/840,532

(22) Filed: Apr. 6, 2020

(65) Prior Publication Data

US 2021/0309341 A1 Oct. 7, 2021

(51) Int. Cl.
*B64C 1/06* (2006.01)
*B64C 1/10* (2006.01)
*B64C 1/12* (2006.01)

(52) U.S. Cl.
CPC ............... *B64C 1/06* (2013.01); *B64C 1/061* (2013.01); *B64C 1/064* (2013.01); *B64C 1/10* (2013.01); *B64C 1/12* (2013.01)

(58) Field of Classification Search
CPC ... B64C 2001/0045; B64C 1/06; B64C 1/061; B64C 1/068; B64C 1/069; B64C 1/0683; B64C 1/10; B64C 1/12
See application file for complete search history.

(56) References Cited

U.S. PATENT DOCUMENTS

| | | | | |
|---|---|---|---|---|
| 6,213,428 B1* | 4/2001 | Chaumel | ................. | B64C 25/14 244/119 |
| 2011/0233334 A1* | 9/2011 | Stephan | .................... | B64C 1/10 244/119 |
| 2013/0146709 A1* | 6/2013 | Bernadet | ................... | B64C 1/18 244/119 |
| 2013/0146710 A1* | 6/2013 | Bernadet | ................. | B64C 25/14 244/119 |
| 2017/0137106 A1* | 5/2017 | Bellet | ..................... | B64C 1/061 |
| 2020/0283117 A1* | 9/2020 | Pearson | ................. | B64C 1/061 |

* cited by examiner

*Primary Examiner* — Richard Green
*Assistant Examiner* — Arfan Y. Sinaki
(74) *Attorney, Agent, or Firm* — Quinn IP Law

(57) ABSTRACT

A flexible strengthening joint for a pressurized vessel includes an outer skin having a localized abrupt change in shape. The outer skin includes a first skin section and a second skin section, the localized abrupt change in shape being located at a junction between the first skin section and the second skin section. A reinforcing bulkhead is located in the interior of the pressurized vessel. The reinforcing bulkhead includes a first bulkhead section that is directly attached to the first section of the outer skin and a second bulkhead section that unattached directly to the first section. A kick frame is located in the interior, the kick frame spanning at least the second bulkhead section. At least one intercostal is secured to the second bulkhead section. The at least one intercostal is also secured to the kick frame.

19 Claims, 4 Drawing Sheets

PRESSURIZED MONOCOQUE STRUCTURE WITH ABRUPT CHANGE IN SHAPE

FIELD

The disclosure relates generally to pressurized monocoque or semi-monocoque structures and more particularly to pressurized aircraft monocoque or semi-monocoque fuselages with abrupt changes in shape.

BACKGROUND

Typical aircraft fuselages have relatively smooth outer shapes to reduce drag during flight. Any changes in fuselage shape are generally gradual in nature so as to not upset airflow over the fuselage. These relatively smooth fuselage shapes are easily reinforced to handle the stress of pressurizing the inner compartments for passengers and/or cargo. These smooth fuselages are good for carrying passengers, or cargo of limited size. These fuselages may not be able to receive cargo loads above certain size dimensions, or irregularly shaped cargo. To solve this problem, some unique cargo aircraft have been developed that have very large changes in fuselage shape, for example a quickly rising volume behind the flight deck area. One example of this type of aircraft is Boeing's® 747 Dreamlifter, which has a cargo compartment that is three times larger than a typical 747-400 freighter. This large cargo compartment requires a change in fuselage shape (getting much larger) from front to back behind the flight deck area, but ahead of the wings. The 747 Dreamlifter is used to carry Boeing® 787 Dreamliner parts that are too big for typical cargo aircraft and that were too large for standard marine shipping containers.

Pressurized aircraft fuselages that have abrupt changes in shape require rigid internal reinforcing structures that are heavy and costly. These rigid internal reinforcing structures are needed to handle the kick loads generated by the fuselage at the shape change location during loading and pressurization. These rigid internal reinforcing structures transfer loads to fuselage areas some distance away from the shape change location, resulting in additional heavy reinforcing structures far away from the shape change location.

SUMMARY

In a first example, a flexible strengthening joint for a pressurized vessel includes an outer skin having a localized abrupt change in shape. The outer skin includes a first skin section defining a first cross-sectional area and a second skin section defining a second cross-sectional area. The localized abrupt change in shape is located at a junction between the first skin section and the second skin section. The outer skin defines an interior capable of pressurization. A reinforcing bulkhead is located in the interior. The reinforcing bulkhead includes a first bulkhead section that is directly attached to the first skin section and a second bulkhead section that unattached directly to the first skin section. A kick frame is located in the interior, the kick frame spanning at least the second bulkhead section. The kick frame is attached to the outer skin. At least one intercostal is secured to the second bulkhead section. The at least one intercostal is also secured to the kick frame. The outer skin separates from the second bulkhead section proximate the second bulkhead section when the interior is pressurized.

In a second example, an aircraft includes a fuselage having an outer skin. The outer skin has a localized abrupt change in shape. The outer skin includes a first skin section defining a first cross-sectional area and a second skin section defining a second cross-sectional area. The localized abrupt change in shape is located at a junction between the first skin section and the second skin section. The outer skin defines an interior capable of pressurization. A reinforcing bulkhead is located in the interior. The reinforcing bulkhead includes a first bulkhead section that is directly attached to the first skin section and a second bulkhead section that unattached directly to the first skin section. A kick frame is located in the interior. The kick frame spans at least the second bulkhead section and the kick frame is directly attached to the outer skin. At least one intercostal is secured to the second bulkhead section. The at least one intercostal is also secured to the kick frame. The outer skin separates from the second bulkhead section proximate the second bulkhead section when the interior is pressurized.

In a third example, a method of allowing an aircraft fuselage to breathe when pressurized includes forming an outer skin of an aircraft with an abrupt change in shape, the outer skin defining an interior capable of being pressurized; reinforcing the outer skin with a bulkhead, the bulkhead being directly attached to the outer skin over a first bulkhead section and the bulkhead being unattached directly to the skin over a second bulkhead section; securing a kick frame to the outer skin, the kick frame being separated from the bulkhead; and connecting the second bulkhead section to the kick frame with a plurality of intercostal.

Any of the first, second, and third examples may include any one or more of the following optional forms.

In one optional form, the at least one intercostal is a cantilever shelf that is connected at one end to the bulkhead and at another end to the kick frame, the intercostal being stiff enough to support the kick frame and the outer skin under airframe loading while being compliant enough to allow the outer skin to breathe when pressurized.

In another optional form, a plurality of intercostals is secured to the second bulkhead section, each of the intercostals in the plurality of intercostals being secured to the second bulkhead section and to the kick frame.

In yet another optional form, a flexible bulkhead strap is located between the bulkhead and the outer skin.

In yet another optional form, the kick frame has a cross-sectional shape of an I-beam or a J-beam.

In yet another optional form, a plurality of gussets connects the first skin section to the second skin section and stabilize a third skin section that forms a transition between the first skin section and the second skin section.

In yet another optional form, the kick frame is directly attached to the plurality of gussets.

In yet another optional form, a plurality of stringers supports the first skin section.

In yet another optional form, a plurality of longerons support the second skin section.

In yet another optional form, positive pressure is applied to the interior and the outer skin is separated from the bulkhead about the second bulkhead section in the vicinity of the abrupt change in shape.

The features, functions, and advantages that have been discussed can be achieved independently in various embodiments or may be combined in yet other embodiments further details of which can be seen with reference to the following description and drawings.

DESCRIPTION

Figure 1:
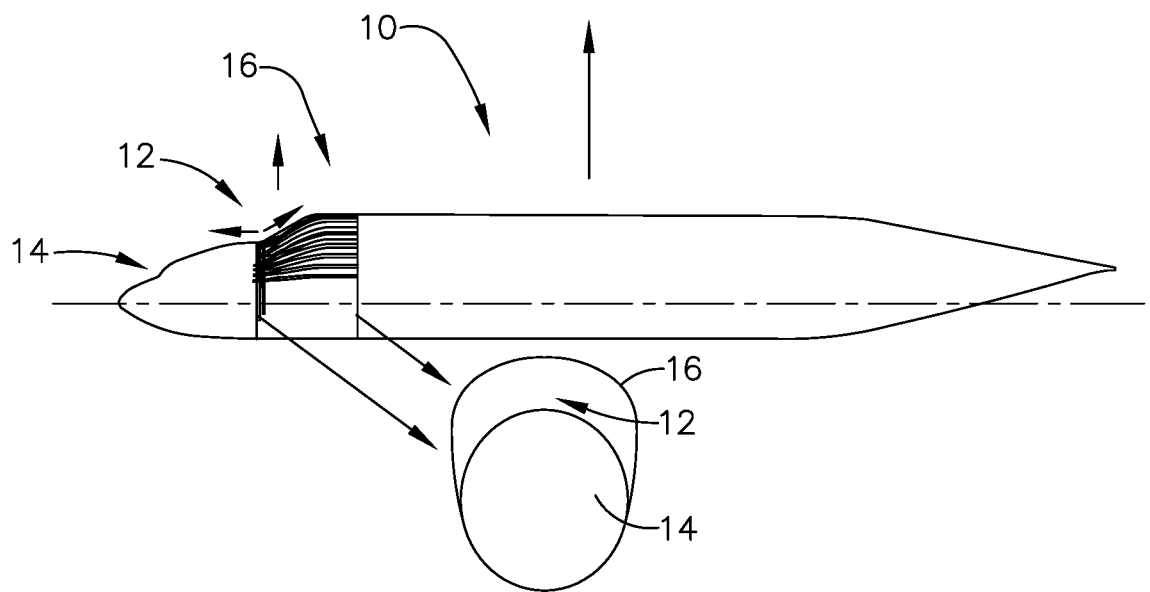
FIG. 1 are side and front views of an aircraft fuselage having an abrupt change of shape.

Turning to FIG. 1, an aircraft having a fuselage 10 is illustrated that has an abrupt change in fuselage shape. The abrupt change of shape occurs in transition region 12 at a junction of a first section 14 and a second section 16. The abrupt change of shape allows the aircraft to have a much larger cargo section than normal, which may accommodate oversize or irregular shaped cargo.

As used herein, an "abrupt change in shape" means a fuselage having a change in fuselage cross-sectional diameter or cross-sectional area that results in large radial loading which exceeds the capability of traditional frames.

Traditionally, fuselages with abrupt changes in shape required a full depth bulkhead. However full depth bulkheads tend to constrain the natural expansion of the fuselage under pressure, which adds stress to airframe components, thereby potentially reducing the useful life of the aircraft. Full depth bulkheads also add considerable weight to the airframe, thereby decreasing useful load and decreasing flight efficiency.

The joints and structures described herein, which use intercostal beams to connect a body frame at the location of the abrupt cross sectional change to a full depth bulkhead located adjacent to the location of abrupt cross sectional change allow natural expansion of the fuselage under pressure while efficiently transferring radial loads to load bearing structures.

Figure 2:
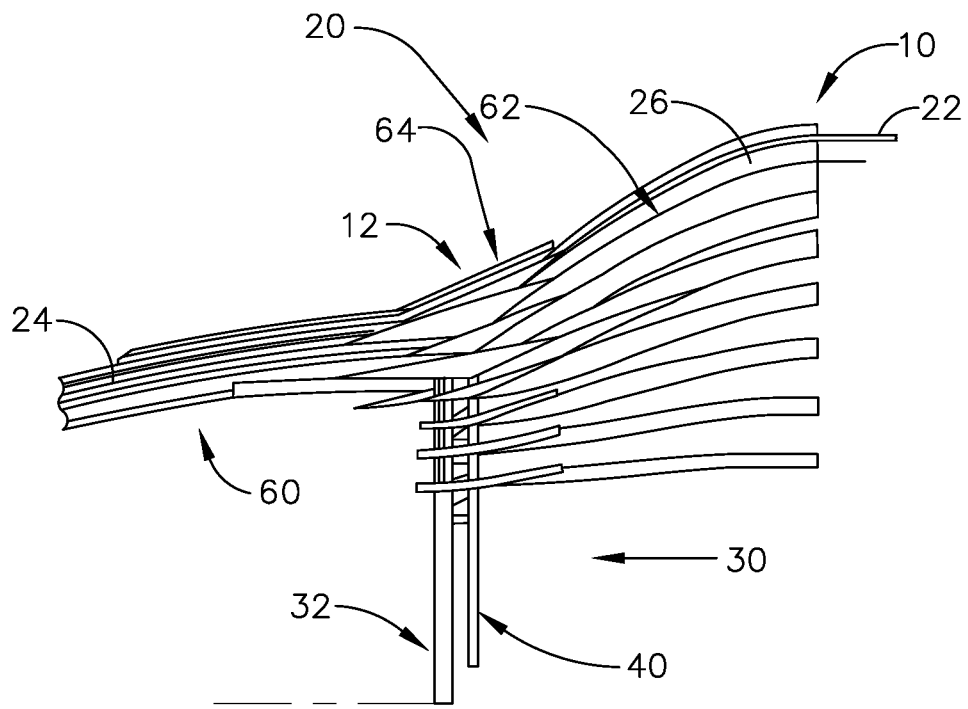
FIG. 2 is a side sectional perspective view of a joint of the aircraft fuselage of FIG. 1 in the vicinity of the abrupt change of shape.
Figure 3A:
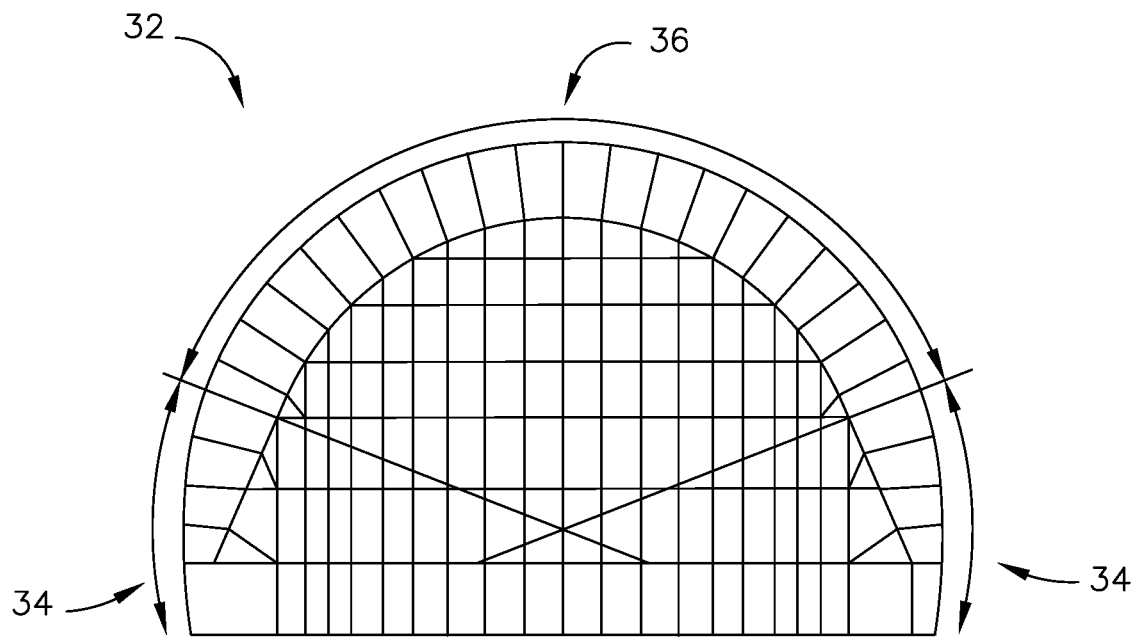
FIG. 3A is a front view of a bulkhead of the joint of FIG. 2.
Figure 3B:
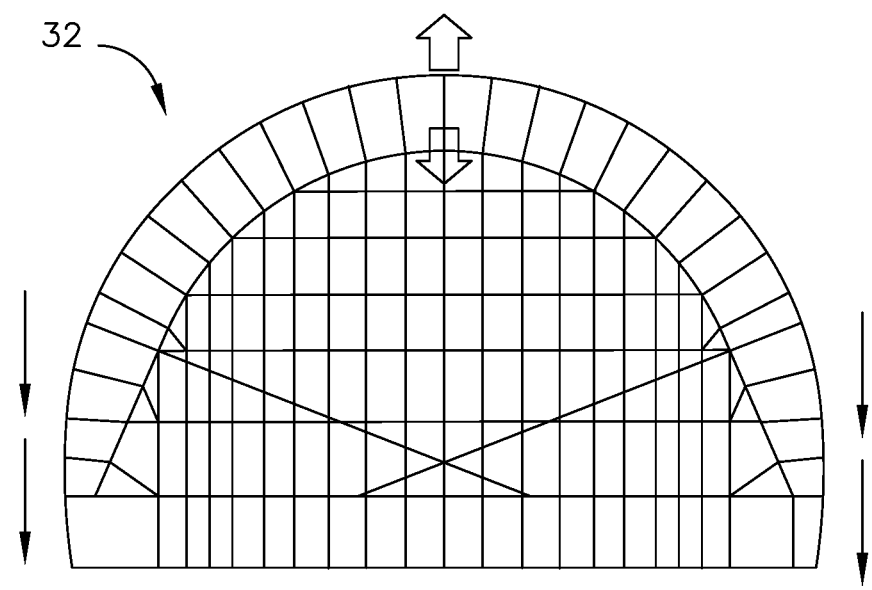
FIG. 3B is a front view of the bulkhead of FIG. 3A showing structural forces when loads are applied to the fuselage.
Figure 4:
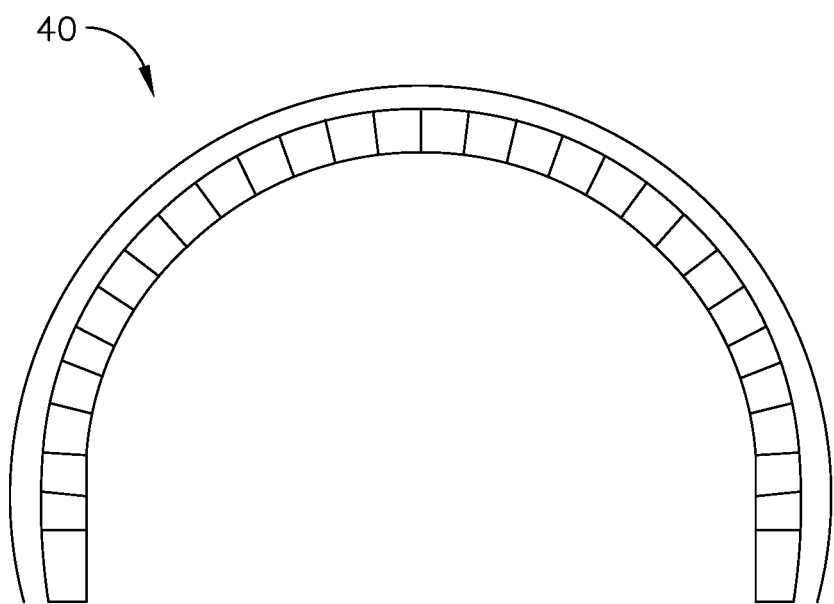
FIG. 4 is a front view of a kick frame of the joint of FIG. 2.
Figure 5:
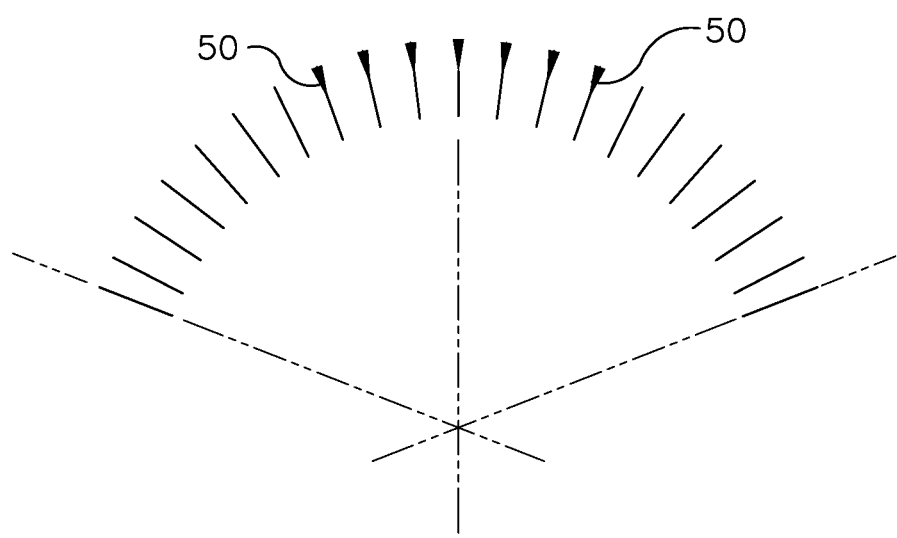
FIG. 5 is a front view of a plurality of intercostals of the joint of FIG. 2.

Turning now to FIGS. 2-4, a flexible strengthening joint 20 for a pressurized vessel, such as the aircraft fuselage 10 includes an outer skin 22 having a localized abrupt change in shape, for example in the transition region 12. The outer skin 22 includes a first skin section 24 defining a first cross-sectional fuselage area and a second skin section 26 defining a second cross-sectional fuselage area. The outer skin 22 defines an interior 30 capable of pressurization. A reinforcing bulkhead 32 is located in the interior 30. The reinforcing bulkhead 32 includes a first bulkhead section 34 that is directly attached to the first skin section 24 and a second bulkhead section 36 that is indirectly attached to the first skin section 24.

Figure 6A:
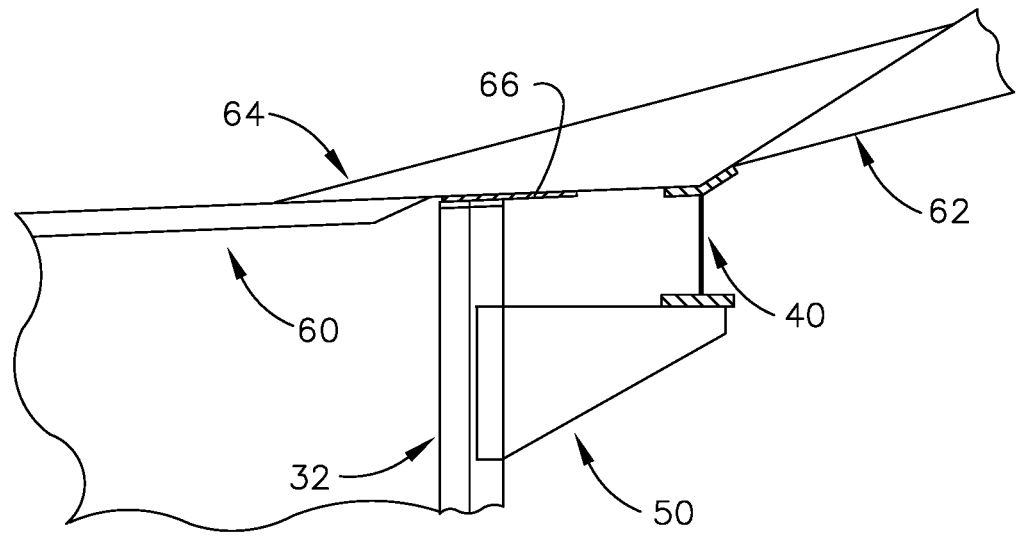
FIG. 6A is a close up side view of the joint of FIG. 2, when the fuselage is not pressurized.
Figure 6B:
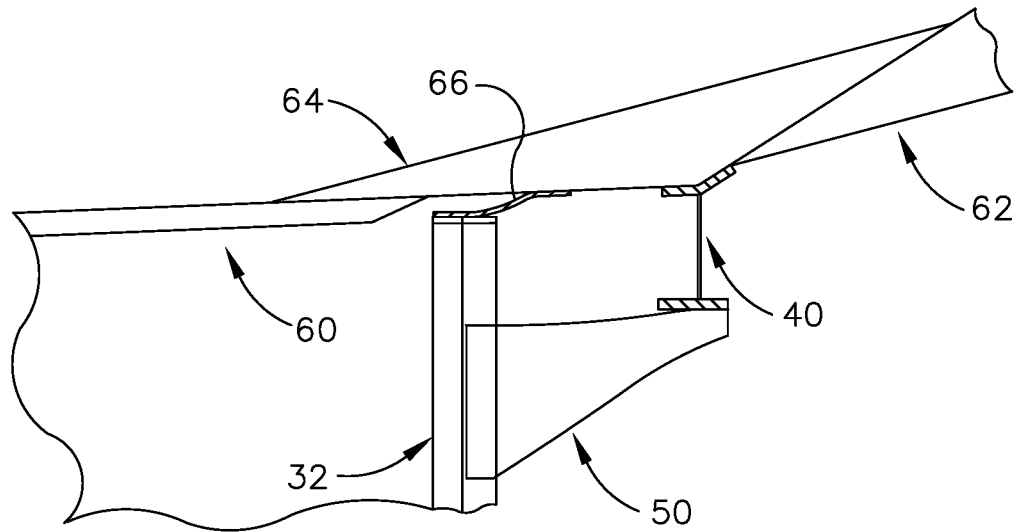
FIG. 6B is a close up side view of the joint of FIG. 2, when the fuselage is pressurized.

A kick frame 40 is located in the interior 30, the kick frame 40 spanning at least the second bulkhead section 36. The kick frame 40 is attached to the outer skin 22. The kick frame 40 may have the shape of an I-beam or a J-beam in some embodiments (see e.g., FIGS. 6A and 6B).

An intercostal 50, for example in a plurality of intercostals 50, is secured to the second bulkhead section 36. The intercostal 50 is also secured to the kick frame 40. The outer skin 22 separates from the second bulkhead section 36 proximate the second bulkhead section 36 when the interior is pressurized, as will be discussed further below.

A plurality of stringers 60 support the first skin section 24 and a plurality of longerons 62 support the second skin section 26. A plurality of gussets 64 join the stringers 60 and the longerons 62 in the vicinity of the transition region 12. The gussets 64 connect the first skin section 24 to the second skin section 26 and stabilize the outer skin 22 that forms the transition region 12 between the first skin section 24 and the second skin section 26. In some embodiments, the kick frame 40 may connect directly to the gussets 64.

An intercostal 50, for example in a plurality of intercostals 50, is secured to the second bulkhead section 36. The intercostal 50 is also secured to the kick frame 40. The outer skin 22 separates from the reinforcing bulkhead 32 proximate the second bulkhead section 36 when the interior is pressurized, as will be discussed further below.

A flexible bulkhead strap 66 may be located between the bulkhead 32 and the outer skin 22. The flexible strap 66 allows the outer skin 22 to expand under pressurization, upward, away from the bulkhead 32 while still maintaining a connection between the outer skin 22 and the bulkhead 32. In one embodiment, the flexible strap 66 may be connected to a gusset 64 and to the bulkhead 32.

The above described joints and structures advantageously allow an aircraft fuselage 10 to breathe when pressurized. The outer skin 22 of an aircraft is formed with an abrupt change in shape. The outer skin 22 is reinforced with a bulkhead 32. The bulkhead 32 is directly attached to the outer skin 22 over the first bulkhead section 34 and the bulkhead is unattached directly to the outer skin 22 over a second bulkhead section 36. The kick frame 40 is secured to the outer skin 22 and the kick frame 40 is separated from the bulkhead. The second bulkhead section 36 is connected to the kick frame 40 with the plurality of intercostals 50, which allow the outer skin 22 to expand under pressurization while still transferring internal forces to the bulkhead 32.

While various embodiments have been described above, this disclosure is not intended to be limited thereto. Variations can be made to the disclosed embodiments that are still within the scope of the appended claims.

What is claimed is:

1. A pressurized vessel having a flexible strengthening joint, the pressurized vessel comprising:
    an outer skin having a localized change in shape, the outer skin including a first skin section defining a first cross-sectional area and a second skin section defining a second cross-sectional area, the localized change in shape being located at a junction between the first skin section and the second skin section, the outer skin defining an interior capable of pressurization;
    a reinforcing bulkhead located within the interior, the reinforcing bulkhead including a first bulkhead section that is directly attached to the first skin section and a second bulkhead section that indirectly attached to the first skin section;
    a kick frame located within the interior and separated from the reinforcing bulkhead, the kick frame spanning at least the second bulkhead section, the kick frame being attached to the outer skin; and
    at least one intercostal within the interior and secured to the second bulkhead section, the at least one intercostal also being secured to the kick frame,
    wherein the outer skin separates from the reinforcing bulkhead proximate the second bulkhead section when the interior is pressurized.

2. The pressurized vessel of claim 1, wherein the at least one intercostal is a cantilever shelf that is connected at one end to the reinforcing bulkhead and at another end to the kick frame, the at least one intercostal both supporting the kick frame and the outer skin under airframe loading and allowing the outer skin to breathe when pressurized.

3. The pressurized vessel of claim 1, further comprising a plurality of intercostals secured to the second bulkhead section, each of the intercostals in the plurality of intercostals being secured to the second bulkhead section and to the kick frame.

4. The pressurized vessel of claim 1, further comprising a flexible bulkhead strap located between the reinforcing bulkhead and the outer skin.

5. The pressurized vessel of claim 1, wherein the kick frame has a cross-sectional shape of an I-beam.

6. The pressurized vessel of claim 1, further comprising a plurality of gussets that connect the first skin section to the second skin section and stabilize a transition between the first skin section and the second skin section.

7. The pressurized vessel of claim 6, wherein the kick frame is directly attached to the plurality of gussets.

8. The pressurized vessel of claim 1, further comprising a plurality of stringers supporting the first skin section.

9. The pressurized vessel of claim 1, further comprising a plurality of longerons supporting the second skin section.

10. An aircraft comprising:
a fuselage having an outer skin, the outer skin having a localized change in shape, the outer skin including a first skin section defining a first cross-sectional area and a second skin section defining a second cross-sectional area, the localized change in shape being located at a junction between the first skin section and the second skin section, the outer skin defining an interior capable of pressurization;
a reinforcing bulkhead located within the interior, the reinforcing bulkhead including a first bulkhead section that is directly attached to the first skin section of the outer skin and a second bulkhead section that is indirectly attached to the first skin section;
a kick frame located within the interior and separated from the reinforcing bulkhead, the kick frame spanning at least the second bulkhead section, the kick frame being attached to the outer skin; and
at least one intercostal within the interior and secured to the second bulkhead section, the at least one intercostal also being secured to the kick frame,
wherein the outer skin separates from the reinforcing bulkhead proximate the second bulkhead section when the interior is pressurized.

11. The aircraft of claim 10, wherein the at least one intercostal is a cantilever shelf that is connected at one end to the reinforcing bulkhead and at another end to the kick frame, the at least one intercostal both supporting the kick frame and the outer skin under airframe loading and allowing the outer skin to breathe when pressurized.

12. The aircraft of claim 10, further comprising a plurality of intercostals secured to the second bulkhead section, each of the intercostals in the plurality of intercostals being secured to the second bulkhead section and to the kick frame.

13. The aircraft of claim 10, further comprising a flexible bulkhead strap located between the reinforcing bulkhead and the outer skin.

14. The aircraft of claim 10, wherein the kick frame has a cross-sectional shape of an I-beam.

15. The aircraft of claim 10, further comprising a plurality of gussets that connect the first skin section to the second skin section and stabilize a transition between the first skin section and the second skin section.

16. The aircraft of claim 15, wherein the kick frame is directly attached to the plurality of gussets.

17. The aircraft of claim 10, further comprising a plurality of stringers supporting the first skin section.

18. The aircraft of claim 10, further comprising a plurality of longerons supporting the second skin section.

19. A method of allowing an aircraft fuselage to breathe when pressurized, the method comprising:
forming an outer skin of an aircraft with a change in shape, the outer skin defining an interior capable of being pressurized;
reinforcing the outer skin with a bulkhead, the bulkhead being directly attached to the outer skin over a first bulkhead section and the bulkhead being indirectly attached to the outer skin over a second bulkhead section;
securing a kick frame to the outer skin, the kick frame being separated from the bulkhead;
connecting the second bulkhead section to the kick frame with a plurality of intercostals; and
applying positive pressure to the interior and separating the outer skin from the bulkhead about the second bulkhead section in a vicinity of the abrupt change in shape.

* * * * *

UNITED STATES PATENT AND TRADEMARK OFFICE
CERTIFICATE OF CORRECTION

PATENT NO. : 11,655,016 B2
APPLICATION NO. : 16/840532
DATED : May 23, 2023
INVENTOR(S) : Richard F. Ewing and Steven D. Ingham It is certified that error appears in the above-identified patent and that said Letters Patent is hereby corrected as shown below:

In the Claims

Claim 19, Column 6, Line 46: "the abrupt change" should read --the change--

Signed and Sealed this
Eighteenth Day of June, 2024

Katherine Kelly Vidal
*Director of the United States Patent and Trademark Office*